US012668396B2

(12) United States Patent　　　(10) Patent No.:　　US 12,668,396 B2
　　Doster et al.　　　　　　　　　　(45) Date of Patent:　　Jun. 30, 2026

(54) DEGRADABLE CONTAINMENT FEATURES

(71) Applicant: Double Double D, LLC, Raleigh, NC (US)

(72) Inventors: Daniel G. Doster, Raleigh, NC (US); Jim F. Warner, Chicago, IL (US); Michael A. DeBrosse, Pineville, OR (US); Sreeju Puthenparambil Vasudevan, Kerala (IN)

(73) Assignee: Double Double D, LLC, Raleigh, NC (US)

( * ) Notice: Subject to any disclaimer, the term of this patent is extended or adjusted under 35 U.S.C. 154(b) by 0 days.

(21) Appl. No.: 18/159,478

(22) Filed: Jan. 25, 2023

(65) Prior Publication Data

US 2023/0159209 A1　　May 25, 2023

Related U.S. Application Data

(63) Continuation of application No. 16/543,179, filed on Aug. 16, 2019, now Pat. No. 11,702,239.

(60) Provisional application No. 62/879,214, filed on Jul. 26, 2019, provisional application No. 62/748,822, filed on Oct. 22, 2018.

(51) Int. Cl.
　　*B65D 1/02*　　　　(2006.01)
　　*B32B 1/08*　　　　(2006.01)
　　*B32B 23/08*　　　(2006.01)
　　*B65D 65/46*　　　(2006.01)

(52) U.S. Cl.
　　CPC ............... *B65D 1/0215* (2013.01); *B32B 1/08* (2013.01); *B32B 23/08* (2013.01); *B65D 65/466* (2013.01); *B32B 2264/102* (2013.01); *B32B 2307/7163* (2013.01); *B32B 2367/00*

(2013.01); *B32B 2439/60* (2013.01); *B65D 2565/381* (2013.01); *Y02W 90/10* (2015.05)

(58) Field of Classification Search
　　CPC . Y02W 90/12; B65D 1/0215; B65D 2565/38; B65D 65/466; B32B 1/08; B32B 23/08; B32B 2264/102; B32B 2307/7163; B32B 2367/00; B32B 2439/60
　　USPC ........................................................ 428/35.7
　　See application file for complete search history.

(56) References Cited

U.S. PATENT DOCUMENTS

| 9,452,863 | B2 | 9/2016 | Dayton et al. |
| 2010/0155396 | A1 | 6/2010 | Warner |
| 2010/0181372 | A1 | 7/2010 | Huang |

(Continued)

FOREIGN PATENT DOCUMENTS

| CN | 106366588 B | 9/2018 |
| JP | H0551073 A | 3/1993 |

(Continued)

OTHER PUBLICATIONS

Song, et al., "The effects of particle size distribution on the optical properties of titanium dioxide rutile pigments and their applications in cool non-white coatings," Solar Energy Materials & Solar Cells, 130 (2014) pp. 42-50. (Year: 2014).*

(Continued)

*Primary Examiner* — Matthew D Matzek
(74) *Attorney, Agent, or Firm* — Dinsmore & Shohl LLP

(57)　　　　　　　ABSTRACT

A degradable containment includes an outer structural layer constructed of a pulp material, a central carrier layer constructed of a biopolymer, and an interior nanomaterial layer constructed of a nanomaterial.

17 Claims, 15 Drawing Sheets

(56)  References Cited

U.S. PATENT DOCUMENTS

| | | | | |
|---|---|---|---|---|
| 2011/0091672 A1* | 4/2011 | Patel | ................... | C08K 5/0016 |
| | | | | 427/579 |
| 2011/0223401 A1* | 9/2011 | Harlin | ............... | C23C 16/45555 |
| | | | | 427/250 |
| 2012/0118886 A1 | 5/2012 | Sekiguchi et al. | | |
| 2015/0308050 A1* | 10/2015 | Corbett | ................ | B65D 1/0207 |
| | | | | 162/218 |
| 2015/0314941 A1* | 11/2015 | Ramadas | ................ | B32B 27/36 |
| | | | | 428/326 |
| 2017/0021994 A1* | 1/2017 | Sebastian | ............... | D21H 19/82 |
| 2018/0127554 A1 | 5/2018 | Mohanty et al. | | |

FOREIGN PATENT DOCUMENTS

| | | | |
|---|---|---|---|
| JP | 2002036442 A | 2/2002 |
| JP | 2002068201 A | 3/2002 |
| JP | 2003013391 A | 1/2003 |
| KR | 101210301 B1 | 12/2012 |
| WO | 2010037906 A1 | 4/2010 |
| WO | 2010042162 A1 | 4/2010 |
| WO | 2017019336 A1 | 2/2017 |

OTHER PUBLICATIONS

International Search Report & Written Opinion mailed on Jan. 7, 2020 in corresponding PCT Application No. PCT/US2019/057217.
Communication pursuant to Article 94(3) EPC issued in European Application No. 19801165.2 mailed on Feb. 18, 2022.
Examination Reports issued in Great Britain Application No. 2105994.4 mailed on Feb. 1 and Apr. 14, 2023.
Peelman, et al. "Application of bioplastics for food packaging" Trends in Food and Science Technology, 2013, pp. 128-141.
Examiners Report issued in Australian Application No. 2019366315 on Dec. 18, 2023.
European Communication Article 94(3) Examination Report, dated Mar. 14, 2024, received in corresponding European Application No. 19801165.2, pp. 1-3.

* cited by examiner

110

112
114
116

116

114

112

DEGRADABLE CONTAINMENT FEATURES

CROSS REFERENCE

This application is a continuation of U.S. application Ser. No. 16/543,179, filed on Aug. 16, 2019 and entitled DEGRADABLE CONTAINMENT FEATURES, which claims the benefit of U.S. Provisional Application Ser. No. 62/748,822, filed on Oct. 22, 2018 and entitled DEGRADABLE CONTAINMENT FEATURES and U.S. Provisional Application Ser. No. 62/879,214, filed Jul. 26, 2019 and entitled DEGRADABLE CONTAINMENT FEATURES, which are all hereby incorporated by reference in their entirety.

TECHNICAL FIELD

Embodiments described herein generally relate to features that maybe utilized on a degradable containment and, more specifically, to features for a paper water bottle.

BACKGROUND

Landfills are filled with plastic bottles that may take years to degrade or which are non-biodegradable. This is because many plastics are not recyclable or they are not properly recycled. Many that are recyclable never reach recycling centers. A beverage company would find it desirable to use ecologically safe containers not only because of the ecological benefits in reusing materials, but because it would reinforce their public esteem.

While current containers utilize a plurality of layers, where at least one of the layers is constructed of a degradable material, various features for these and other types of containers remain deficient. As such, a need exists in the industry for improved features for an ecologically safe container.

SUMMARY

According to first aspect of the present disclosure, a degradable containment comprises an outer structural layer constructed of a pulp material, a central carrier layer constructed of a biopolymer and an interior nanomaterial layer constructed of a nanomaterial.

According to a second aspect of the present disclosure, a degradable containment comprises an outer structural layer constructed of a pulp material including wood by-products, bamboo, hemp, minerals, agricultural waste, recycled materials, or a mixture of two or more thereof; a central carrier layer constructed of a biopolymer including polyhydroxyalkanoate, polybutylene succinate, lignin, or a mixture of two or more thereof; and an interior nanomaterial layer constructed of a nanomaterial including at least one of a silicon dioxide nanomaterial and a zinc oxide nanomaterial.

According to third aspect of the present disclosure, a degradable containment comprises an outer structural layer constructed of a pulp material including any organic or organic-based products, such as wood by-products (including paper), bamboo, hemp, minerals, agricultural waste, recycled materials, or a mixture of two or more thereof; a central carrier layer constructed of a biopolymer including polyhydroxyalkanoate, polybutylene succinate, lignin, or a mixture of two or more thereof; an interior nanomaterial layer constructed of a nanomaterial including at least one of a silicon dioxide nanomaterial and a zinc oxide nanomaterial; and a modular containment neck secured in a top portion of the degradable containment.

BRIEF DESCRIPTION OF THE DRAWINGS

The embodiments set forth in the drawings are illustrative and exemplary in nature and not intended to limit the disclosure. The following detailed description of the illustrative embodiments can be understood when read in conjunction with the following drawings, where like structure is indicated with like reference numerals and in which.

DETAILED DESCRIPTION

Figures 1, 2:
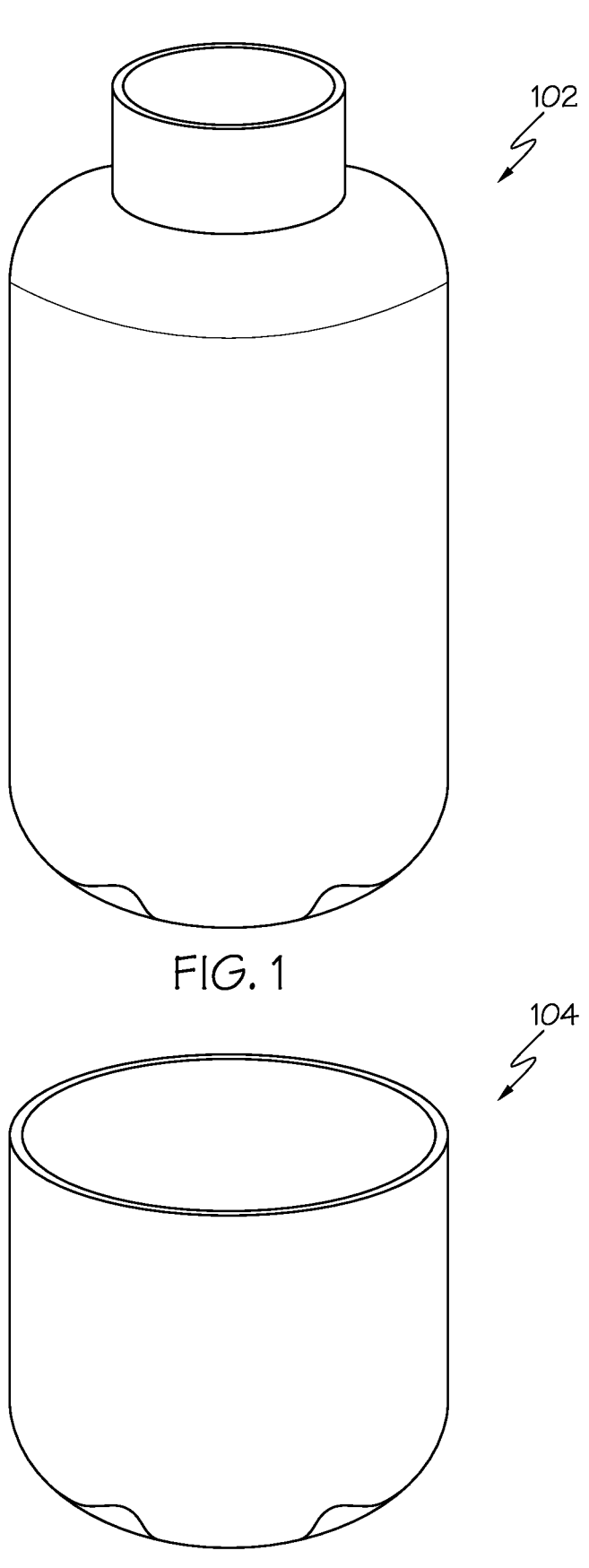
FIG. 1 shows a perspective view of an exemplary embodiment of a containment wherein the containment is in the form of a bottle, according to embodiments described herein.
FIG. 2 shows a perspective view of another exemplary embodiment of a containment, wherein the containment is in the form of a jar, according to embodiments described herein.

The present disclosure provides a degradable containment including an outer structural layer constructed of a pulp material, a central carrier layer constructed of a biopolymer, and an interior nanomaterial layer constructed of a nanomaterial. The central carrier layer may act as a fluid barrier and prevent deterioration of the outer structural layer. In some embodiments, the central carrier layer may degrade relatively quickly. As such, an interior nanomaterial layer with a slower deterioration rate (but still degradable) may be utilized to extend the shelf life of the central carrier layer and the degradable containment as a whole. The central carrier layer may enable adhesion between the interior nanomaterial layer and the outer structural layer. The carrier layer may provide the structural support necessary for the degradable containment, eliminating the need for an outer structural layer. The degradable containment may also include a modular containment neck configured to seal fluid inside the containment.

In accordance with one aspect of the present disclosure, a degradable containment comprises an outer structural layer constructed of a pulp material, a central carrier layer constructed of a biopolymer, and an interior nanomaterial layer constructed of a nanomaterial.

In one embodiment, the pulp material may be created from any organic or organic-based products, such as wood by-products (including paper), bamboo, hemp, minerals, agricultural waste, recycled materials, or a mixture of two or more thereof. Similarly, some embodiments of the biopolymer include polyhydroxyalkanoate, polybutylene succinate, lignin, or a mixture of two or more thereof. In some embodiments, the biopolymer is dispersed in a solvent, the solvent including dichloromethane, dichlorodimethylsilane, hydrofluoroether, or a mixture of two or more thereof. In some embodiments, the nanomaterial includes silicon dioxide nanomaterial or zinc oxide nanomaterial. Similarly, some embodiments may be configured with the biopolymer including polyhydroxyalkanoate, polybutylene succinate, lignin, or a mixture of two or more thereof, the biopolymer being dispersed in a solvent, the solvent including dichloromethane, dichlorodimethylsilane, hydrofluoroether, or a mixture of two or more thereof, and the nanomaterial including at least one of a silicon dioxide nanomaterial and a zinc oxide nanomaterial.

In accordance with a second aspect of the present disclosure, a degradable containment comprises an outer structural layer constructed of a pulp material created from any organic or organic-based products, such as wood by-products (including paper), bamboo, hemp, minerals, agricultural waste, recycled materials, or a mixture of two or more thereof; a central carrier layer constructed of a biopolymer including polyhydroxyalkanoate, polybutylene succinate, lignin, or a mixture of two or more thereof; and an interior nanomaterial layer constructed of a nanomaterial including at least one of a silicon dioxide nanomaterial and a zinc oxide nanomaterial.

In one embodiment, the central carrier layer is applied directly to the interior surface of the outer structural layer and the interior nanomaterial layer is applied directly to an interior surface of the central carrier layer. In some embodiments, the central carrier layer and the interior nanomaterial layer are included in a combined layer applied directly to an interior surface of the outer structural layer. Similarly, some embodiments may be configured with the biopolymer being dispersed in a solvent, the solvent including dichloromethane, dichlorodimethylsilane, hydrofluoroether, or a mixture of two or more thereof. In another embodiment, the outer structural layer includes two mirror halves that are pieced together during production before the central carrier layer and the interior nanomaterial layer are applied. In another embodiment, the outer structural layer includes two mirror halves, each mirror half having at least one flange, the at least one flange from one of the two mirror halves aligning with the at least one flange from the other of the two mirror halves to seal the outer structural layer, the central carrier layer, and the interior nanomaterial layer together. Similarly, some embodiments may be configured with at least one of the central carrier layer and the interior nanomaterial layer extending onto the at least one flange of each of the two mirror halves and acting as an adhesive to seal the outer structural layer, the central carrier layer, and the interior nanomaterial layer together. In some embodiments, the central carrier layer and the interior nanomaterial layer extend from a cavity of the degradable containment, wrap around the outer structural layer at a lid receiving portion of the degradable containment, and continue on to cover at least a portion of an exterior surface of the outer structural layer.

In accordance with a third aspect of the present disclosure, a degradable containment comprises an outer structural layer constructed of a pulp material including any organic or organic-based products, such as wood by-products (including paper), bamboo, hemp, minerals, agricultural waste, recycled materials, or a mixture of two or more thereof; a central carrier layer constructed of a biopolymer including polyhydroxyalkanoate, polybutylene succinate, lignin, or a mixture of two or more thereof; an interior nanomaterial layer constructed of a nanomaterial including at least one of a silicon dioxide nanomaterial and a zinc oxide nanomaterial; and a modular containment neck secured in a top portion of the degradable containment.

In one embodiment, the modular containment neck may be constructed with similar materials as the containment and thus may include polypropylene, high density polyethylene, a biodegradable polymer, a biodegradable non-polymer, polypropylene, high density polyethylene, biopolymer (including polyhydroxyalkanoate, polybutylene succinate, lignin, or a mixture of two or more thereof) or a mixture thereof. In another embodiment, the modular containment neck includes at least one tab configured to secure the modular containment neck in the top portion of the degradable containment. In another embodiment, the modular containment neck includes a screw-top configured to form a seal between the degradable containment and the modular containment neck. In another embodiment, the modular containment neck includes a securing flange configured to secure the modular containment neck in the top portion of the degradable containment. In another embodiment, the degradable containment further includes a lid securable to the modular containment neck.

Additional advantages of the degradable containment features described herein will be set forth, and in part will be readily apparent to those skilled in the art from that description or recognized by practicing the embodiments described herein, including the detailed description, the claims, as well as the appended drawings.

Reference will now be made in detail to various embodiments of degradable containment features. According to one embodiment, a degradable containment includes an outer structural layer constructed of a pulp material, a central carrier layer constructed of a biopolymer, and an interior nanomaterial layer constructed of nanomaterial. In embodiments, the pulp material includes any organic or organic-based products, such as wood by-products (including paper), bamboo, hemp, minerals, agricultural waste, recycled materials, or a mixture of two or more thereof; the biopolymer includes polyhydroxyalkanoate, polybutylene succinate, lignin, or a mixture of two or more thereof; and the nanomaterial includes at least one of a silicon dioxide nanomaterial and a zinc oxide nanomaterial. In some embodiments, the degradable containment further includes a modular containment neck secured in a top portion of the degradable containment.

Various embodiments of degradable containment features will now be described in further detail herein with specific references to the illustrative drawings.

Referring now to the drawings, FIGS. 1 and 2 depict containments according to embodiments described herein. The containment may take the form of a bottle 102 as illustrated in FIG. 1, ajar 104 as illustrated in FIG. 2, a container, or other receptacle for fluid or solid. In embodiments, the containment may be a paper water bottle.

The containment may be sized to define a predetermined interior volume for containing fluid (e.g., a volume of the cavity). For example, the containment may define an interior volume of about 1 milliliter (ml), about 10 ml, about 50 ml, about 100 ml, about 250 ml, about 500 ml, about 750 ml, about 1 liter, about 1.5 liter, about 2 liter, about 2.5 liter, about 5 liter, about 10 liter, etc., or any value or range between any two of these values (including endpoints). However, it should be understood that the volumes listed herein are merely illustrative and that the embodiments described herein are not limited to such.

Figure 3:
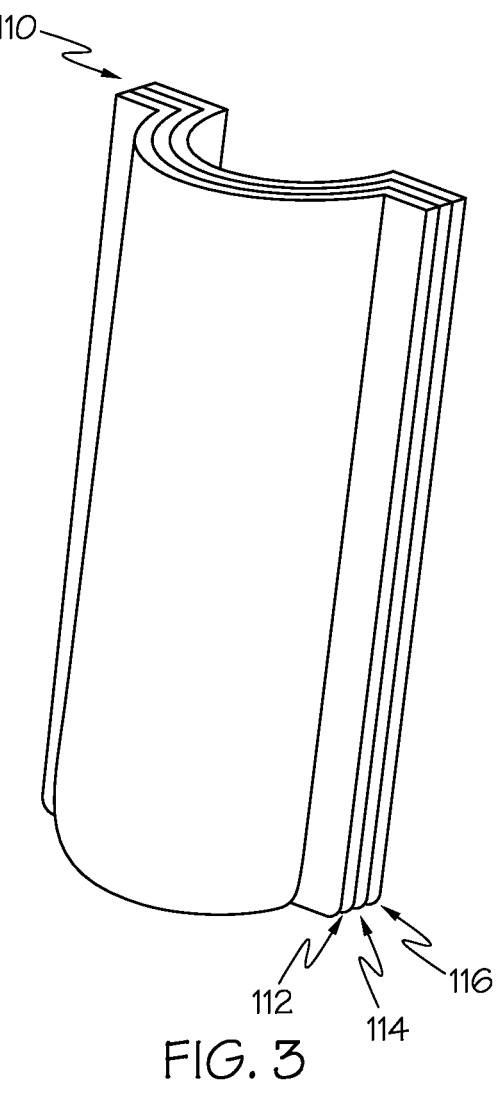
FIG. 3 shows a perspective view of an exemplary multi-layered containment according to embodiments described herein.
Figure 4:
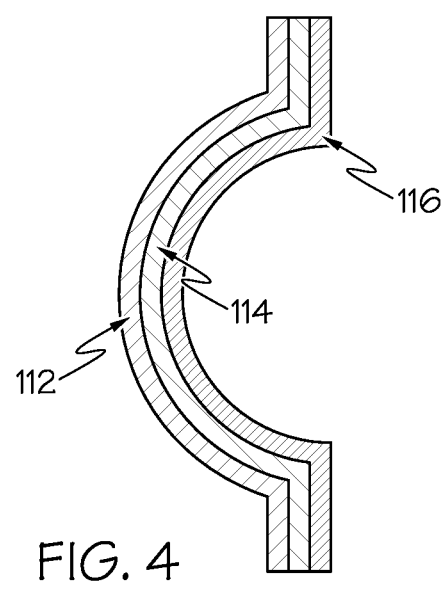
FIG. 4 shows a top, plan view of the multi-layered containment of FIG. 3, according to embodiments described herein.

Referring now to FIGS. 3 and 4, an exemplary multi-layered containment according to embodiments described herein is shown at 110. As illustrated, the containment 110 may take the form of a bottle. The containment 110 may include an outer structural layer 112, a central carrier layer 114, and an interior nanomaterial layer 116. The containment 110 represents one-half of a bottle that may be assembled with another half to create the bottle.

The outer structural layer 112 may be constructed of an environmentally friendly, recyclable, degradable (such as biodegradable, compostable, solar degradable, polymer or non-polymer material, and/or other eco-friendly material) material. The outer structural layer 112 may be constructed of an organic or organic-based material. The outer structural layer 112 may be constructed of a pulp material. The outer structural layer 112 may be constructed of wood by-products (including paper), bamboo, hemp, bagasse, or a mixture of two or more thereof. The outer structural layer 112 may be formed to define the desired size and/or shape for the containment 110. The outer structural layer 112 may have a thickness to achieve the desired structural integrity, rigidity, thermal properties, and insulating properties for the particular application. As an example, a disposable water bottle may have predetermined properties that are relatively standard in the industry. Other containments may alter these properties based on the particular application. The outer structural layer 112 may have a similar structural integrity and rigidity as an aluminum can or a plastic bottle.

The central carrier layer 114 may be constructed of a biodegradable polymer, such as polypropylene, polyethylene, or a mixture of thereof. The central carrier layer 114 may be constructed of a degradable polymer or non-polymer material or other similar material. In embodiments, the central carrier layer 114 may be constructed of biopolymer, such as polyhydroxyalkanoate (PHA), polybutylene succinate (PBS), lignin, or a mixture of two or more thereof. The central carrier layer 114 may include a biopolymer dispersed in a solvent. The solvent may include dichloromethane (DCM), dichlorodimethylsilane (DCMS), hydrofluoroether, or a mixture of two or more thereof. The biopolymer and solvent may be present in the central carrier layer 114 in varying concentrations to achieve the desired properties. The central carrier layer 114 may be sprayed onto an interior surface of the outer structural layer 112, applied as a film to an interior surface of the outer structural layer 112 in a layering process, or coated onto an interior surface of the outer structural layer 112 in a bathing process. The central carrier layer 114 may be liquid impermeable, whereas the outer structural layer 112 may be subject to at least some permeability. However, depending on the particular biopolymer utilized for the central carrier layer 114, degradation of the central carrier layer 114 may occur relatively quickly.

The interior nanomaterial layer 116 may be constructed of a nanomaterial, such as silicon dioxide nanomaterial, zinc oxide nanomaterial, or a mixture thereof. In embodiments, the interior nanomaterial layer 116 may be sprayed onto an interior surface of the central carrier layer 114. In embodiments, the interior nanomaterial layer 116 may be layered upon the central carrier layer 114. In embodiments, the central carrier layer 114 may include a biopolymer as described above and the interior nanomaterial layer 116 may include a nanomaterial as described above. In embodiments, the central carrier layer 114 may include a biopolymer and a solvent as described above and the interior nanomaterial layer 116 may include a nanomaterial as described above. In some embodiments, the central carrier layer 114 and the interior nanomaterial layer 116 may be included a combined layer, such as a pre-layered film or a liquid mixture, and applied to the outer structural layer 112 in a single application. A pre-layered film including the central carrier layer 114 and the interior nanomaterial layer 116 may be applied to an interior surface of the outer structural layer 112. A liquid mixture may include the nanomaterial mixed in liquid form with the biopolymer and applied to the outer structural layer 112. The pre-layered film or liquid mixture may include a biopolymer, a solvent, and a nanomaterial as described above. The biopolymer, solvent, and nanomaterials may be present in the pre-layered film or liquid mixture in varying concentrations to achieve the desired properties.

The nanoparticle structures (i.e., silicon dioxide, zinc oxide, or a combination thereof) of the interior nanomaterial layer 116 according to embodiments described herein may have properties that may not be present in conventional oxide coatings (e.g., ceramic silicon oxide, zinc oxide, or other metal oxide coatings). For example, in embodiments, the nanoparticle structures may be biodegradeable. In some embodiments, the nanoparticle structures may increase water, temperature, and alkali resistance of the overlying central carrier layer 114. In other embodiments, the nanoparticle structures may increase the gas barrier properties (e.g., carbon dioxide, oxygen, water vapor, etc.) of the overlying central carrier layer 114. In some embodiments, the nanoparticle structures may increase the shelf life of the containment 110 by providing an additional protective layer to the overlying central carrier layer 114, such as by insulating the central carrier layer 114 from contents contained in the containment 110. Similarly, in other embodiments, the nanoparticle structures may provide ultraviolet light protection to the overlying central carrier layer 114. In some embodiments, the nanoparticle structures may be pressure wash resistant during containment cleaning or filling. In other embodiments, the nanoparticle structures may exhibit hydrophobic and/or super hydrophobic properties, such as anti-static (i.e., resist dust and dirt depositing on the surface). Hydrophobic layers may also be self-cleaning. Since liquids do not adhere to a hydrophobic surface, almost all of the contents of a containment 110 having an interior nanomaterial layer 116 may empty out of the containment 110. In some embodiments, zinc oxide nanomaterial may be antibacterial (i.e., selective toxicity to bacteria). In other embodiments, the interior nanomaterial layer 116 may not be visible.

In some embodiments, the outer structural layer 112 may have a texture that does not easily allow application of a nanomaterial directly onto the outer structural layer 112. However, introduction of the biopolymer allows both adhesion between the interior nanomaterial layer 116 and the outer structural layer 112, as well as longer shelf life that might not be available if only the biopolymer was used.

It should be understood that in embodiments, the containment 110 may include a structural layer 112 and a carrier layer 114, but lack a nanomaterial layer 116. In some embodiments, the containment 110 may include a structural layer 112 and a nanomaterial layer 116, but lack a carrier layer 114. In still some embodiments, the containment 110 may include a carrier layer 114 and a nanomaterial layer 115, but lack a structural layer 112.

Figure 5:
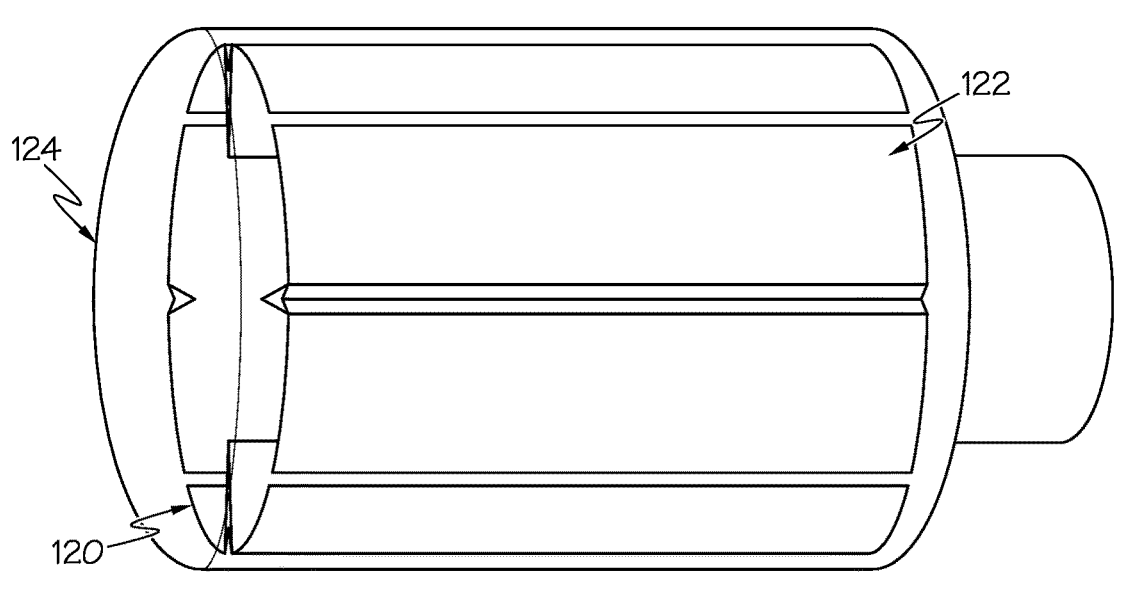
FIG. 5 shows a perspective view of a collapsible core that may be used to form the containment according to embodiments described herein.
Figure 6:
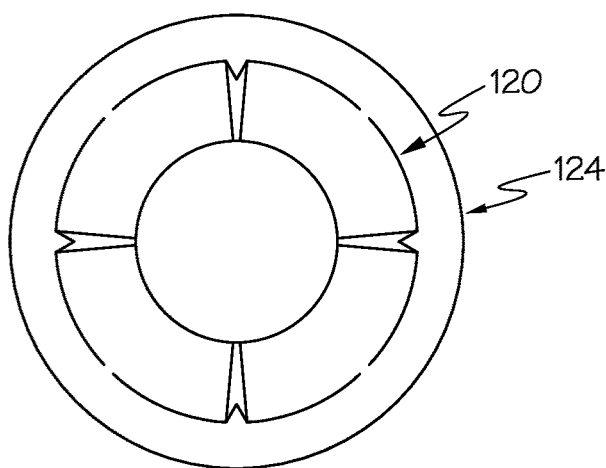
FIG. 6 shows a perspective view of the collapsible core of FIG. 5 wherein the collapsible core is extended, according to embodiments described herein.
Figure 7:
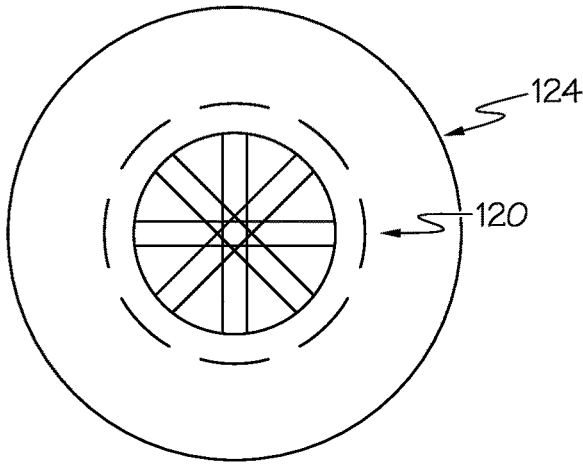
FIG. 7 shows a perspective view of the collapsible core of FIG. 5, wherein the collapsible core is collapsed, according to embodiments described herein.

Referring now to FIGS. 5-7, a collapsible core 120 may be utilized to form an outer structural layer of a containment according to embodiments described herein. The collapsible core 120 enables the formation of an outer structural layer as a single, unitary piece. The collapsible core 120 may include a screen material 122 or other configuration. During manufacturing, pulp material of the outer structural layer is on the outside of the screen material 122. Vacuum or mechanical pressure may be inserted onto the inside of the collapsible core 120 to cause the fully extended collapsible core 120 as shown in FIG. 6 to collapse as shown in FIG. 7 to enable removal of the collapsible core 120 from the outer structural layer after the outer structural layer is formed.

Figure 8:
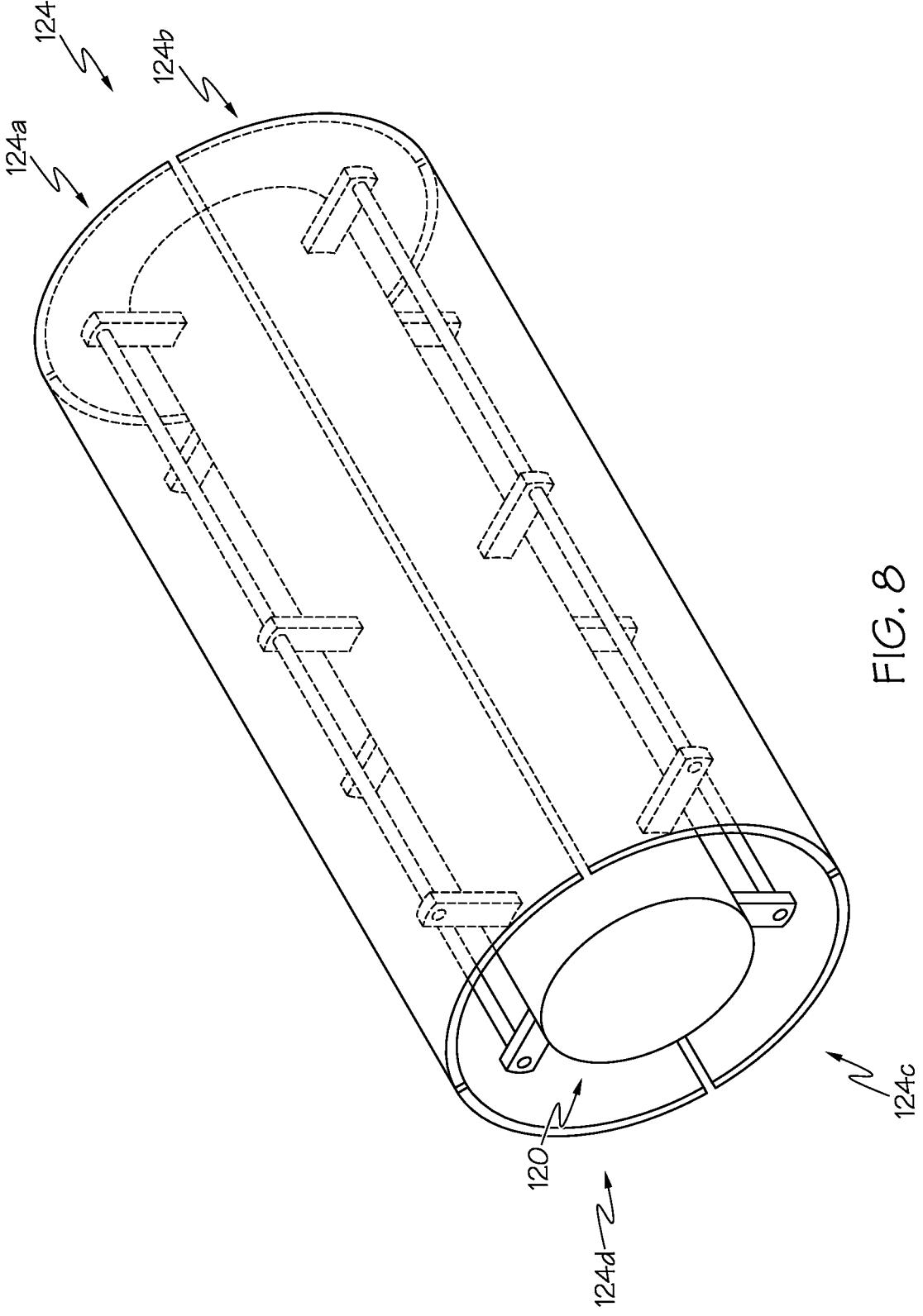
FIG. 8 shows a perspective view of the collapsible core of FIG. 5, wherein a cylinder is expanded, according to embodiments described herein.
Figure 9:
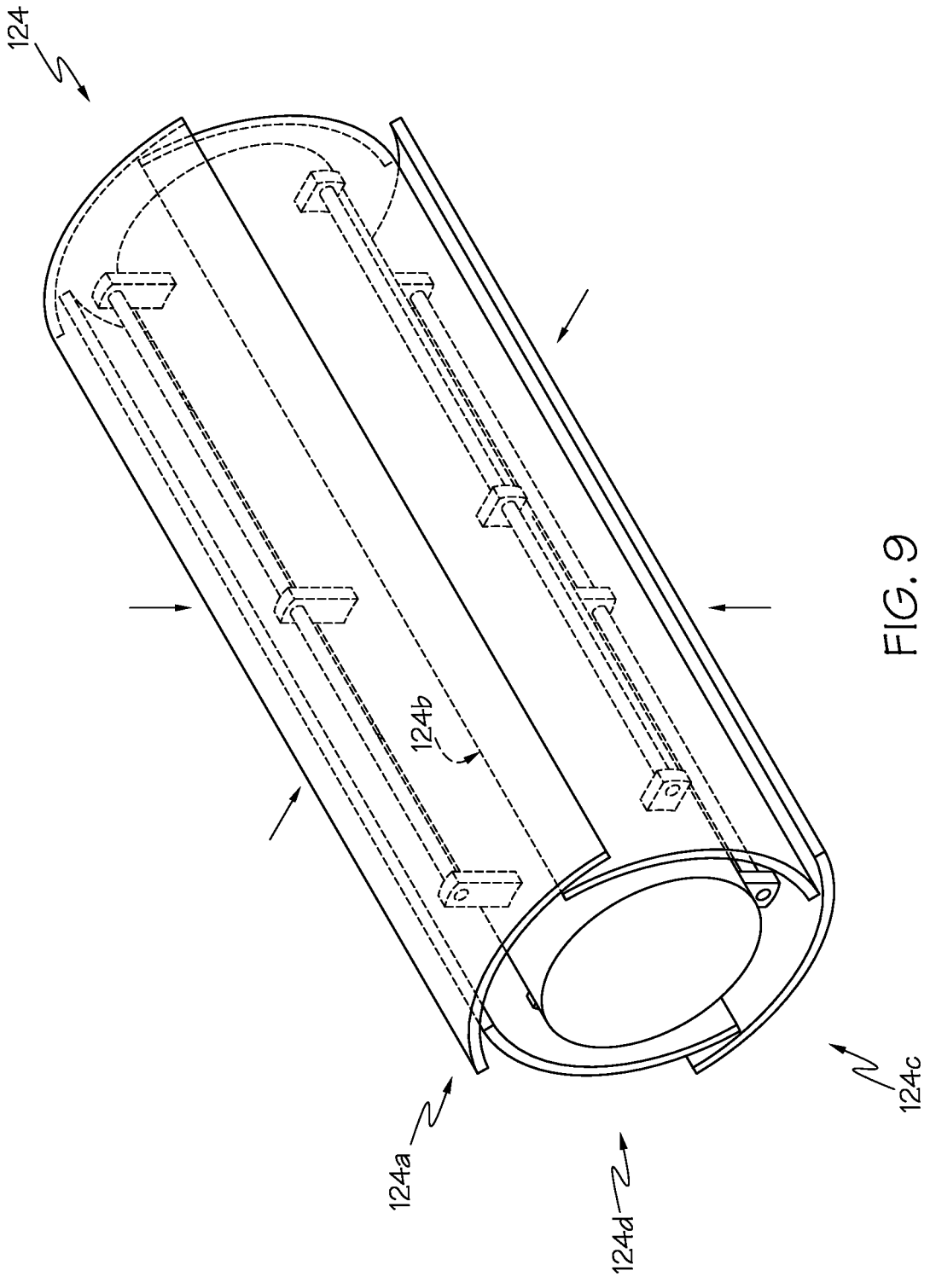
FIG. 9 shows a perspective view of the collapsible core of FIG. 5, wherein the cylinder is retracted, according to embodiments described herein.

FIGS. 8 and 9 depict the collapsible core 120 in additional detail according to embodiments described herein. As illustrated, a cylinder 124 may include a plurality of leaves 124a, 124b, 124c, 124d, which may expand or retract to define the desired containment size and/or shape. Once the size of the cylinder 124 is defined, the collapsible core 120 may be expanded to create the desired thickness of the pulp material for the outer structural layer of the containment. The pulp material is then placed between the cylinder 124 and the collapsible core 120. Upon setting the pulp material, the collapsible core 120 may be collapsed and removed to allow the pulp material to cure.

It should be understood that embodiments may be configured such that, while the collapsible core 120 may be fully collapsed and removed from the cylinder 124 upon setting the pulp material, this is one example. In embodiments, the collapsible core 120 may collapse slightly, such that when the pulp material contracts during curing, the pulp material maintains the desired size and shape for the containment. In embodiments, more than one collapsible core 120 may be used to form the outer structural layer.

Figure 10:
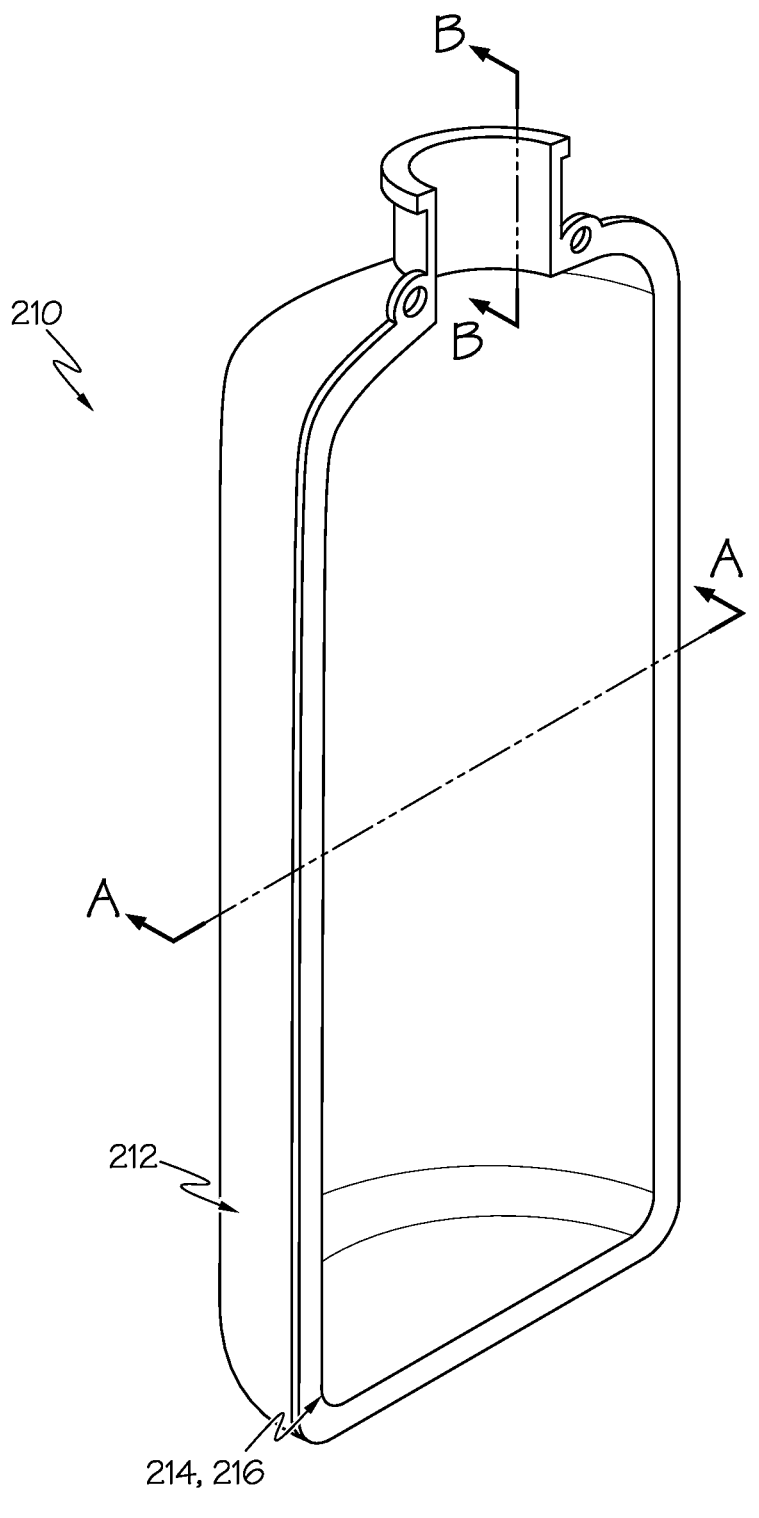
FIG. 10 shows a perspective view of another exemplary multi-layered containment, according to embodiments described herein.
Figures 11, 12, 13, 14:
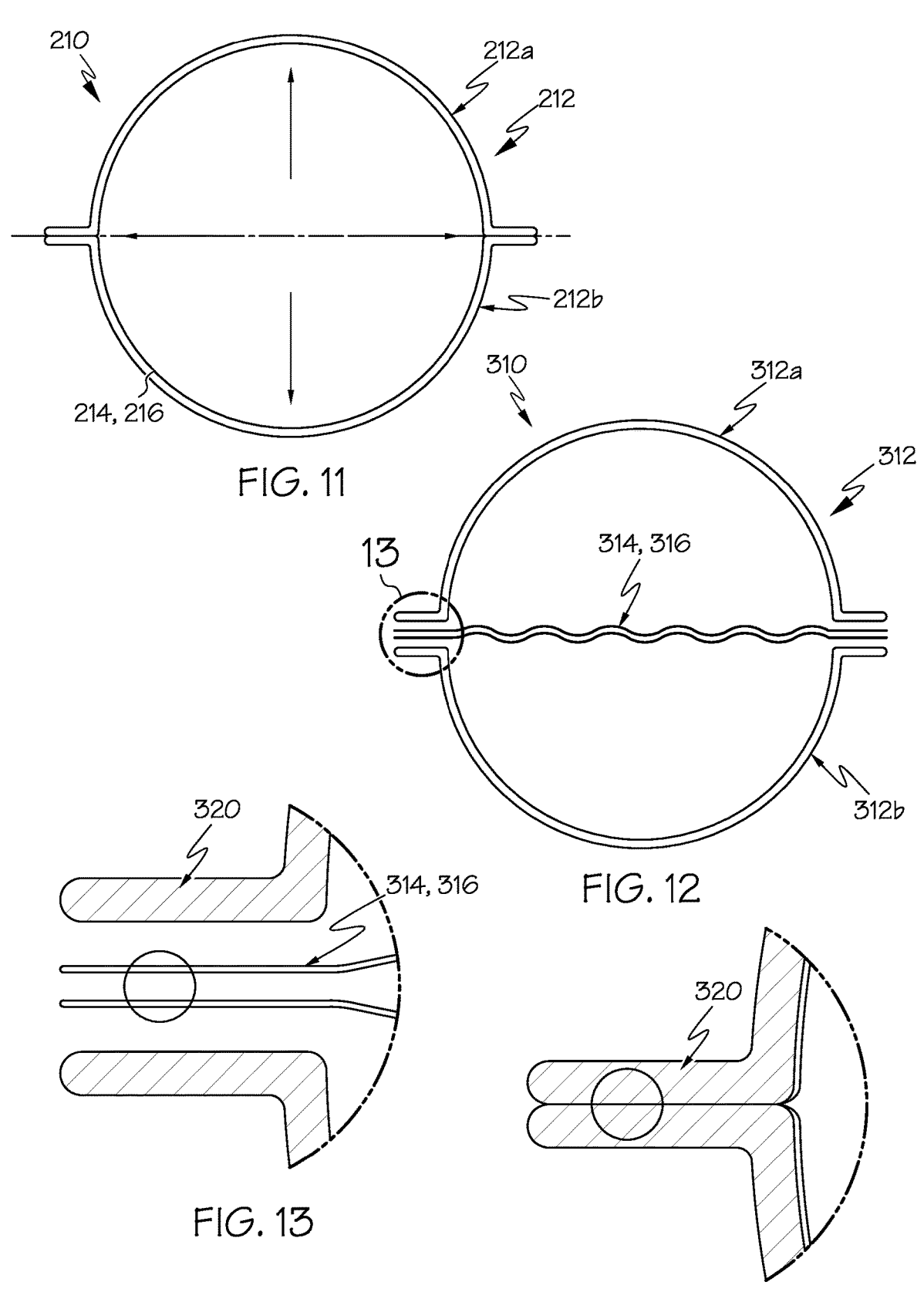
FIG. 11 shows a sectional view taken along line A-A of FIG. 10, wherein the central carrier layer and the interior nanomaterial layer are applied to the outer structural layer after piecing the two halves of the outer structural layer together, according to embodiments described herein.
FIG. 12 shows another embodiment of a sectional view taken along lines A-A of FIG. 10, wherein the outer structural layer includes flanges that may be utilized to further secure the central carrier layer and/or interior nanomaterial layer, according to embodiments described herein.
FIG. 13 shows a magnified view of the sectional view of FIG. 12, wherein the central carrier layer and the interior nanomaterial layer extend onto the flanges of the outer structural layer, according to embodiments described herein.
FIG. 14 shows a magnified view of the sectional view of FIG. 12, wherein the outer structural layer, the central carrier layer, and the interior nanomaterial layer are sealed together, according to embodiments described herein.

Referring now to FIGS. 10 and 11, another exemplary multi-layered containment according to embodiments described herein is shown at 210. As illustrated, the containment 210 may take the form of a necked bottle. The containment 210 may be constructed of two halves, as described above. In some embodiments, the two halves may be separate pieces, while some embodiments may be constructed as a single piece that is folded over and sealed at the remaining portions of the periphery. Regardless, the outer structural layer 212 may have two mirror image halves 212a, 212b that are pieced together during production. In post-assembly processing embodiments, after piecing the two mirror image halves 212a, 212b of the outer structural layer 212 together, a central carrier layer 214 and an interior nanomaterial layer 216 may be applied to an interior surface of the outer structural layer 212. As discussed above, the central carrier layer 214 may be applied directly to the outer structural layer 212. In embodiments, the central carrier layer 214 and/or the interior nanomaterial layer 216 may be applied as a combined film or liquid mixture to the outer structural layer 212.

Referring now to FIGS. 12-14, another embodiment of the multi-layered containment of FIG. 10 according to embodiments described herein is shown at 310. In embodiments, two mirror halves 312a, 312b of an outer structural layer 312 of a containment 310 may each have at least one flange 320 that may be utilized to further secure a central carrier layer 314 and/or interior nanomaterial layer 316. Specifically, when the two mirror halves 312a, 312b are sealed together as illustrated in FIG. 14, the at least one flange 320 of each of the mirror halves 312a, 312b may align to provide additional surface area to seal the three layers 312, 314, 316 together. The central carrier layer 314 and/or interior nanomaterial layer 316 may extend onto the at least one flange 320 of each of the mirror halves 312a, 312b of the outer structural layer 312 and act as an adhesive to seal the three layers 312, 314, 316 together, eliminating the need for an additional adhesive or fastener. Sealing may be performed using any suitable techniques depending on the materials used for the three layers 312, 314, 316, such as by employing heat, pressure, or radio frequency energy.

Figures 15, 16:
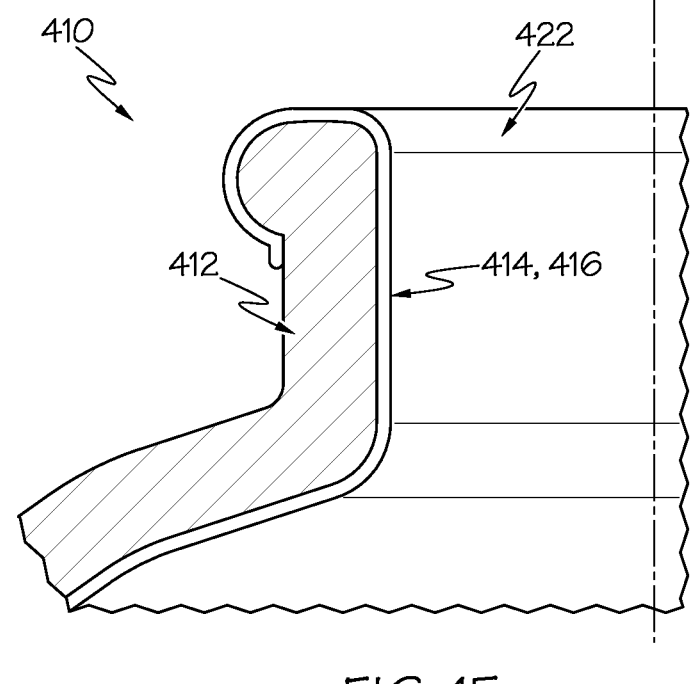
FIG. 15 shows a sectional view of an embodiment taken along lines B-B of FIG. 10, wherein a central carrier layer and an interior nanomaterial layer are used to cover at least a portion of the exterior surface of the outer structural layer, according to embodiments described herein.
FIG. 16 shows the sectional view of FIG. 15, further including a lid, according to embodiments described herein.

Referring now to FIGS. 15 and 16, in embodiments, a central carrier layer 414 and an interior nanomaterial layer 416 may be used to cover at least a portion of an exterior surface of the outer structural layer 412 of the containment 410. As described above, the central carrier layer 414 and the interior nanomaterial layer 416 may be sprayed on, layered, and/or otherwise adhered to the outer structural layer 412. As shown, the central carrier layer 414 and the interior nanomaterial layer 416 may extend from a cavity of the containment 410, wrap around the outer structural layer 412 at a lid receiving portion 422 of the containment 410, and continue on to cover at least a portion of an exterior surface of outer structural layer 412 of the containment 410. In embodiments, the central carrier layer 414 and/or the interior nanomaterial layer 416 may cover a substantial portion or the entire exterior surface of the containment 410. Additionally, embodiments may only cover the lid receiving portion 422 or other sub-region of the containment 410. In embodiments, the central carrier layer 414 and/or the interior nanomaterial layer 416 may, upon curing or drying, shrink and wrap around the outer structural layer 412 at the lid receiving portion 422 of the containment 410. In embodiments, the central carrier layer 414 and/or the interior nanomaterial layer 416 may be removably secured to the external surface of the containment 410. In examples where permanent adhesion to the exterior surface of the containment 410 is not a priority, embodiments may or may not utilize both the central carrier layer 414 and the interior nanomaterial layer 416. Specifically, as one function of the biopolymer is adhesion, embodiments may not utilize the central carrier layer 414. Similarly, in those embodiments where shelf life is acceptable using only the biopolymer, those embodiments may not utilize the interior nanomaterial layer 416.

As illustrated, the interior nanomaterial layer 416 may be exposed and thus may line the lid receiving portion 422 of the containment 410. The lid receiving portion 422 may include a threaded configuration or other configuration for receiving and removably securing a lid 424. Having the interior nanomaterial layer 416 exposed allows a lid 424 with another liquid impermeable material (or the same material) to contact the interior nanomaterial layer 416, thereby creating a liquid tight seal.

Figure 17:
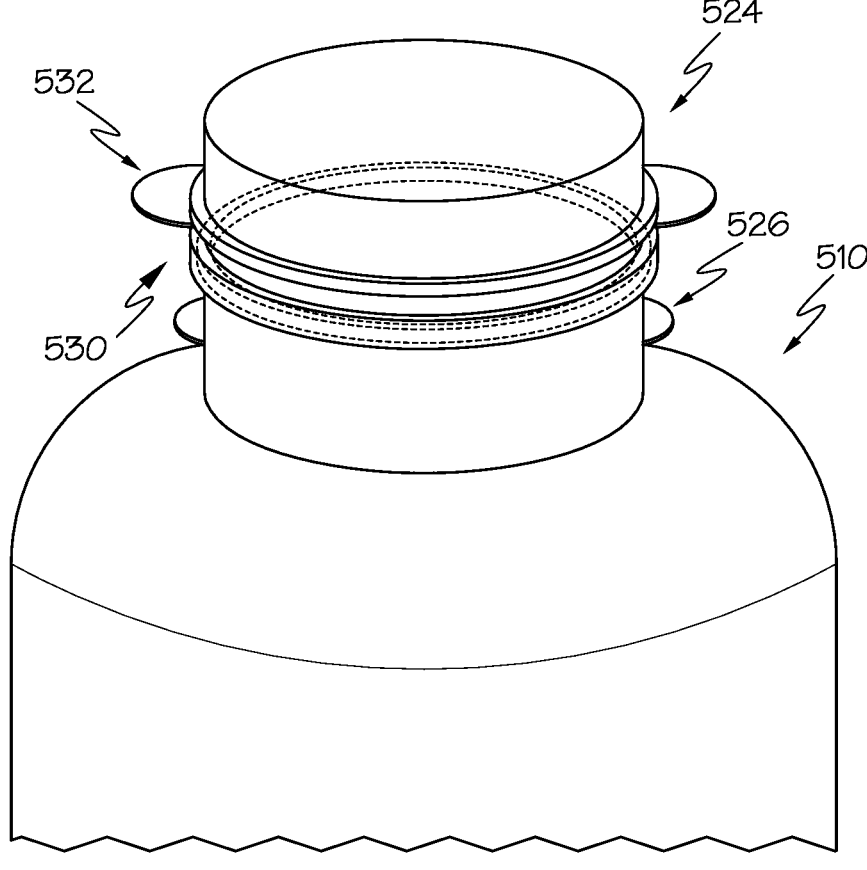
FIG. 17 shows a perspective view of an exemplary modular containment neck, according to embodiments described herein.

Referring now to FIG. 17, an exemplary interchangeable package component according to embodiments described herein is shown. The modular containment neck 530 may be made of a biodegradable polymer such as polypropylene, high density polyethylene, biopolymer (including polyhydroxyalkanoate, polybutylene succinate, lignin, or a mixture of two or more thereof) or a mixture thereof. The modular containment neck 530 may be made of a biodegradable non-polymer or the like. The modular containment neck 530 may be inserted into a top portion of a previously formed containment 510. The modular containment neck 530 may be formed to enable use with differently sized and shaped containments. For example, some embodiments may be configured such that the modular containment neck 530 is manufactured for various types of containments at a reduced cost. In these embodiments, the modular containment neck 530 may allow a manufacturer to delay making a decision about what type of containment to produce based on consumer demand. In some embodiments, a modular containment neck 530 may enable a user to replace or switch out a first lid (or first modular portion) for a second lid (or second modular portion) depending on the desired function of the containment 510. As shown, in embodiments, a first portion of the modular containment neck 530 may extend into the containment 510 and a second portion of the modular containment neck 530 may remain outside the containment 510. In embodiments, the entire modular containment neck 530 may be located inside the containment 510. The containment 510 may be constructed to include at least one tab 526 that matches up with at least one tab 532 from the modular containment neck 530 to secure the modular containment neck 530 in place. The modular containment neck 530 may include a standard screw-top configuration or other configuration that allows sealing of the fluid inside the containment 510, both between a lid 524 and the modular containment neck 530 and between the containment 510 and the modular containment neck 530.

It should be understood that tabs 526 and tabs 532 maybe configured as a solitary section of material that extends from an edge of the bottle. However, some embodiments may be configured such that the tabs 526 and/or tabs 532 are configured to extend along a larger portion (or the entirety) of a side of the containment 510.

Figures 18, 19, 20:
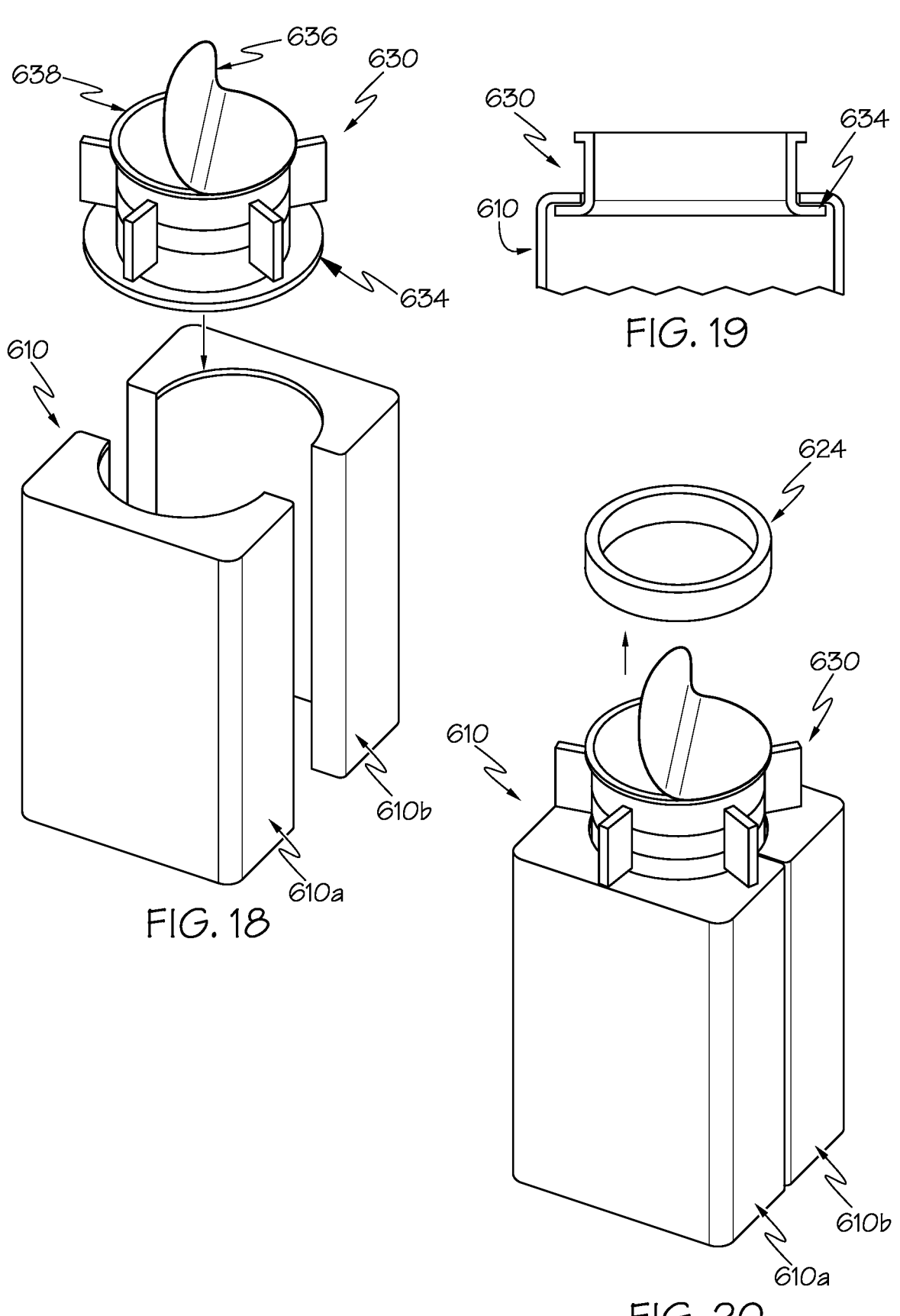
FIG. 18 shows a perspective view another exemplary modular containment neck, according to embodiments described herein.
FIG. 19 shows a sectional view of the modular containment neck of FIG. 18, wherein the modular containment neck is secured between two halves of the containment, according to embodiments described herein.
FIG. 20 shows a perspective view of the modular containment neck of FIG. 19, further including a lid, according to embodiments described herein.

Referring now to FIGS. 18-20, another exemplary modular containment neck according to embodiments described herein is shown at 630. The modular containment neck 630 may include a securing flange 634 that secures the modular containment neck 630 to a containment 610. In embodiments, the containment 610 may be constructed with two halves 610a, 610b secured together. The modular containment neck 630 may be inserted between the two halves 610a, 610b, thus being secured when the two halves 610a, 610b are secured together as illustrated in FIGS. 19 and 20. The modular containment neck 630 may include a peel-off 636 and/or threaded 638 portion, to which a lid 624 may be removably secured.

Figure 21:
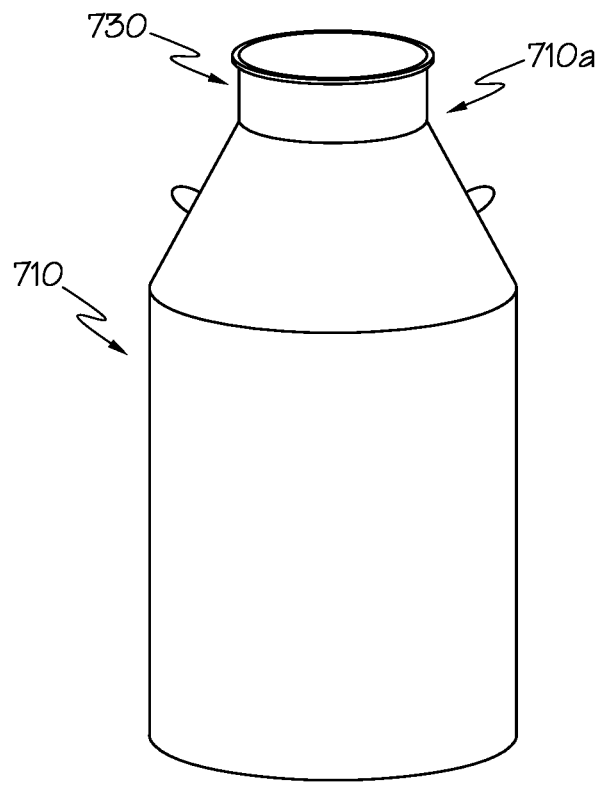
FIG. 21 shows a perspective view of another exemplary modular containment neck, according to embodiments described herein.
Figure 22:
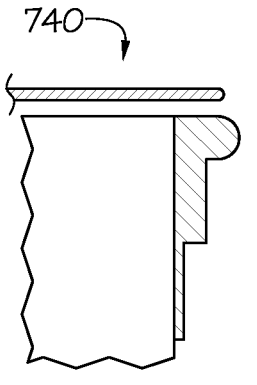
FIG. 22 shows a sectional view of an embodiment of the modular containment neck of FIG. 21, wherein the modular containment neck includes a foil laminated stock, according to embodiments described herein.
Figure 23:
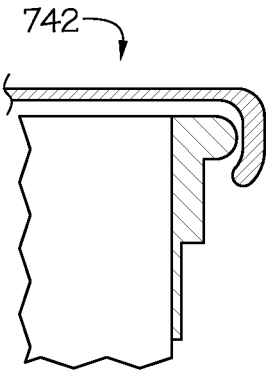
FIG. 23 shows a sectional view of another embodiment of the modular containment neck of FIG. 21, wherein the modular containment neck includes a snap on lid, according to embodiments described herein.
Figure 24:
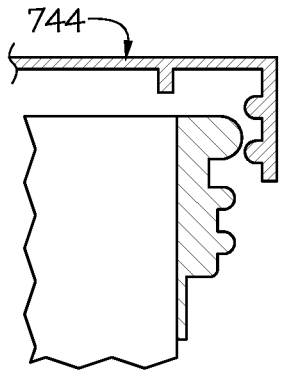
FIG. 24 shows a sectional view of another embodiment of the modular containment neck of FIG. 21, wherein the modular containment neck includes a threaded lid, according to embodiments described herein.
Figure 25:
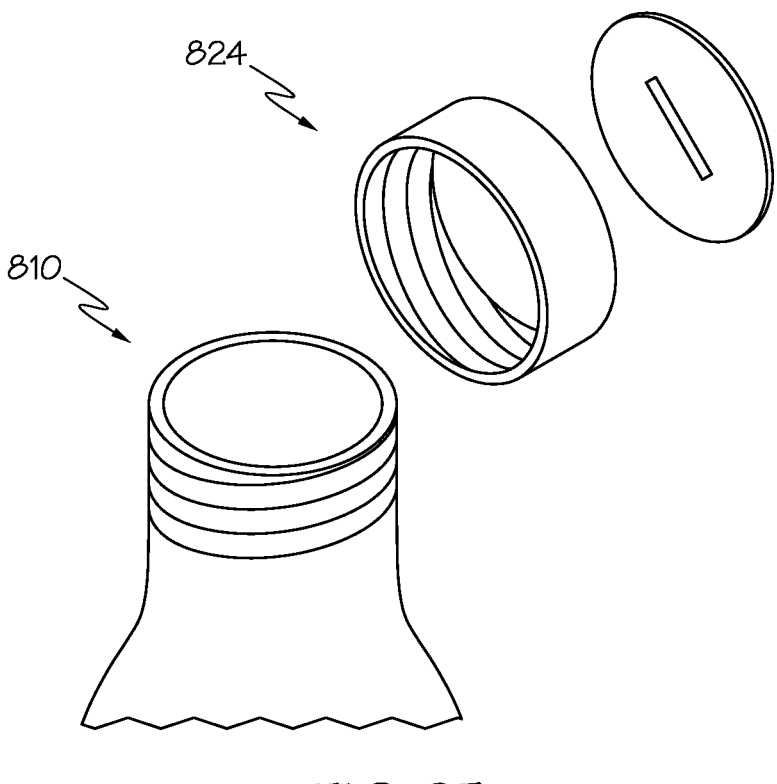
FIG. 25 shows a perspective view of an exemplary lid according to embodiments described herein.
Figure 26:
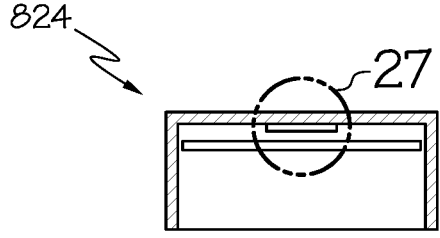
FIG. 26 shows a sectional view of the lid of FIG. 25, according to embodiments described herein.
Figure 27:
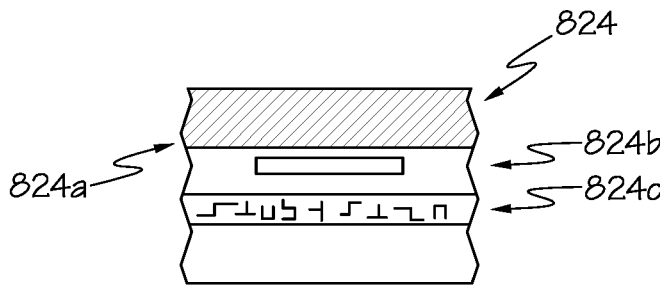
FIG. 27 shows a magnified view of the sectional view of FIG. 26, according to embodiments described herein.
Figure 28:
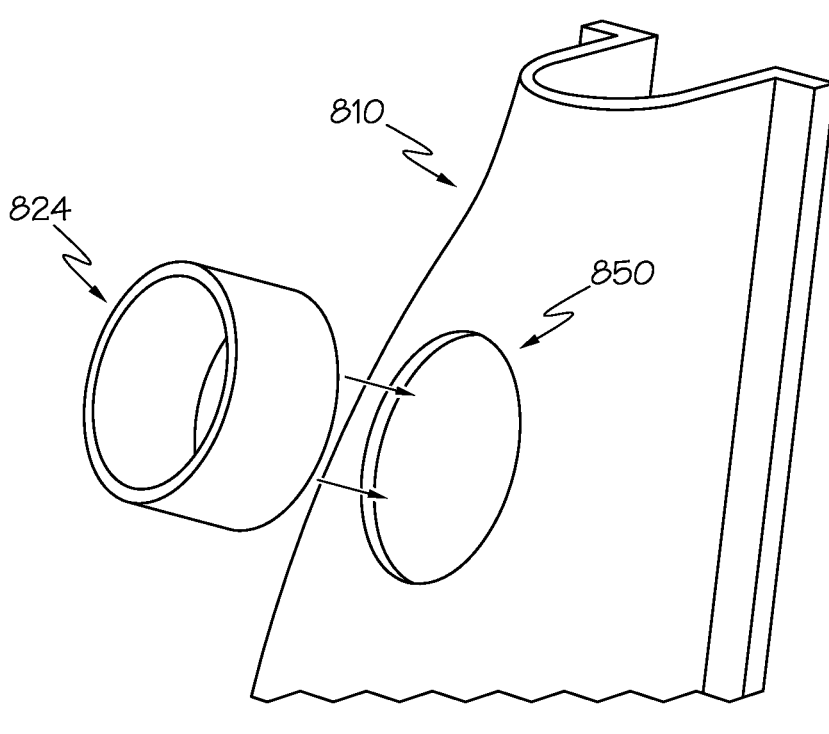
FIG. 28 shows a perspective view of the lid of FIG. 25, wherein the lid is being inserted into a receiving station of a containment, according to embodiments described herein.
Figure 29:
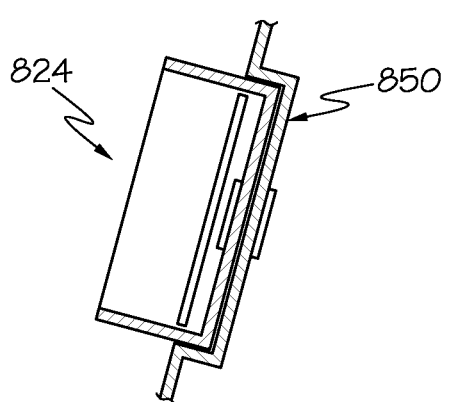
FIG. 29 shows a perspective view of the lid of FIG. 25, wherein the lid is in the receiving station of the containment, according to embodiments described herein.
Figure 30:
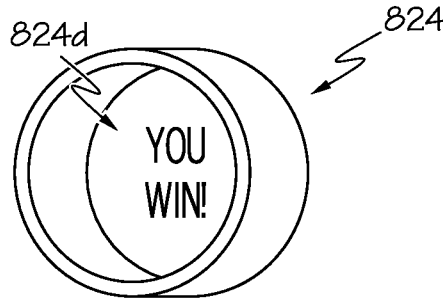
FIG. 30 shows a perspective view of the lid of FIG. 25, wherein the display is illuminated, according to embodiments described herein.

Referring now to FIG. 21, another exemplary modular containment neck according to embodiments described herein is shown at 730. The modular containment neck 730 may be smaller than and/or trimmed down from the modular containment neck 530 in FIG. 17. The modular containment neck 730 may include foil laminated stock 740 as illustrated in FIG. 22, a snap on lid 742 as illustrated in FIG. 23, and a threaded lid 744 as illustrated in FIG. 24. An edge of the containment 710 at a neck 710a may receive the closure 740, 742, 744, which may be made of pulp or may include a second layer of material applied to the pulp or may be an inserted component added to the pulp. The closures 740, 742, 744 may be made of biodegradable and/or non-biodegradable materials. Additionally, the closures 740, 742, 744 may be a flap of pulp hinged from the containment 710.

Referring now to FIGS. 25-30, an exemplary lid according to embodiments described herein is shown. The electronic display lid 824 includes a pulp material layer 824a, a magnetic and/or conductive material layer 824b, and a circuitry layer 824c. The circuitry layer 824c may include tone technology or other circuitry, an illuminated readout screen, a power supply, temperature gauge, positioning system, etc., depending on the embodiment. Accordingly, embodiments may be configured such that the containment 810 includes a receiving section 850. When the electronic display lid 824 is removed and placed in the receiving section 850, this may complete the circuit to illuminate the display 824d. The receiving section 850 may also include a magnet or other adhesive to allow the electronic display lid 824 to be removably secured to the receiving section 850. The display 824d may provide information, such as results of a sweepstakes, product information, commercials, etc.

It should be understood that embodiments may include a power supply in the electronic display lid 824, such that attaching the electronic display lid 824 to the receiving section 850 is not necessary. As an example, once the electronic display lid 824 is removed, a circuit may be completed, thereby allowing power to be applied to the circuitry and/or display. Thus, once opened, the display may show the desired information.

Similarly, embodiments may be provided to output an inaudible tone that may be perceptible to a mobile device or other computing device. The inaudible tone may activate advertisements on the mobile device, and/or perform other functions.

Figures 31, 32, 33:
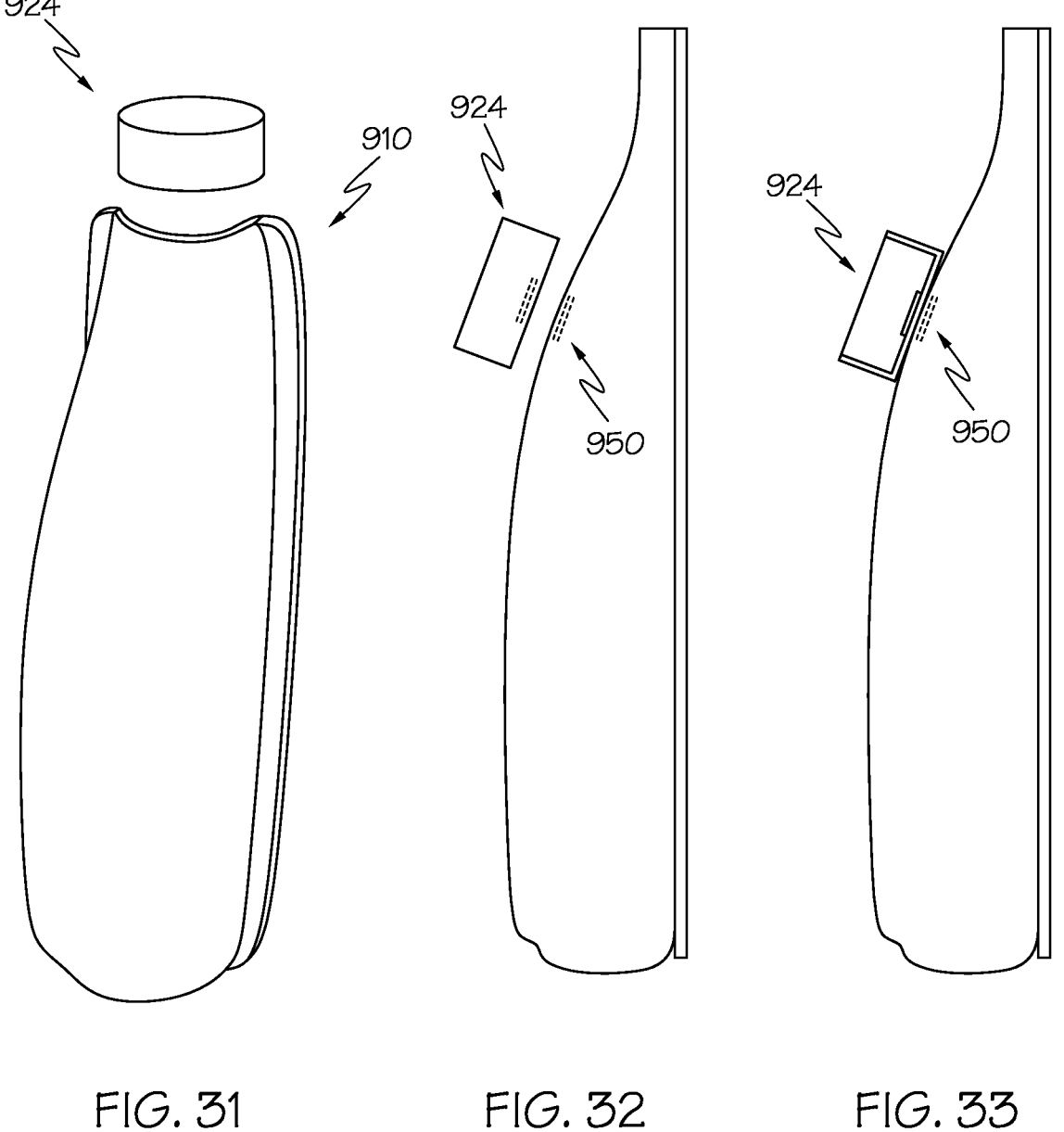
FIG. 31 shows a perspective view of another exemplary lid according to embodiments described herein, according to embodiments described herein.
FIG. 32 shows a perspective view of the lid of FIG. 31, wherein the lid is being placed onto a magnetic receiving station of the containment, according to embodiments described herein.
FIG. 33 shows a perspective view of the lid of FIG. 31, wherein the lid is on the magnetic receiving station of the containment, according to embodiments described herein.

Referring now to FIGS. 31-33, another exemplary lid according to embodiments described herein is shown. As illustrated, a containment 910 may include a magnetic lid 924. The containment 910 may also include a magnetic receiving section 950, which may include a magnet and be shaped or otherwise configured to receive the magnetic lid 924. It should be understood that other adhesives could be used as well, including glue, Velcro, clasps, etc.

Figure 34:
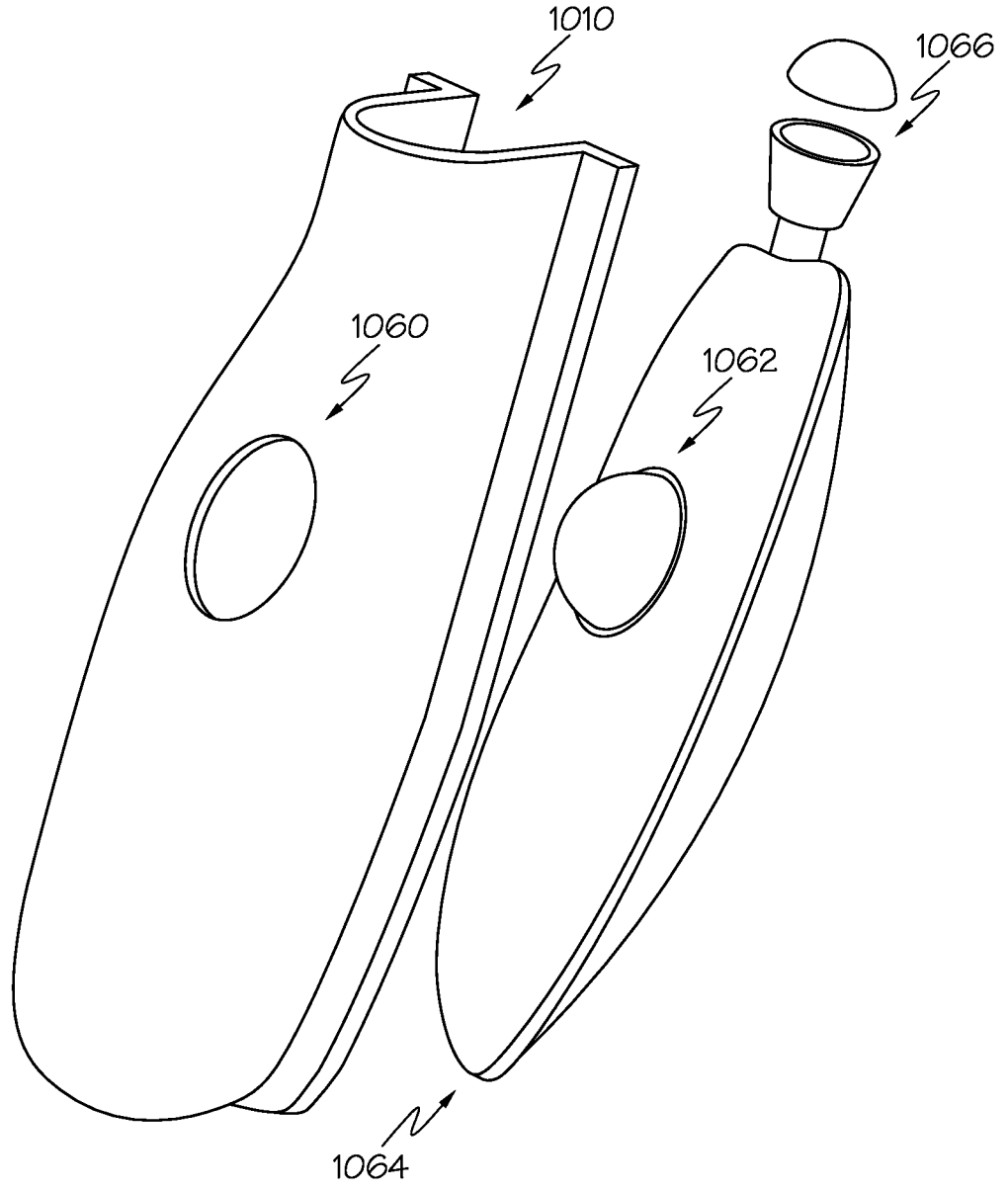
FIG. 34 shows a perspective view of another exemplary containment, according to embodiments described herein.

Referring now to FIG. 34, another exemplary containment according to embodiments described herein is shown. A squeezable bottle pump containment 1010 may include an opening 1060 for receiving a pump actuator 1062 from an air pouch 1064. The air pouch 1064 may be formed as described above and/or via other mechanisms. The pump actuator 1062 may be configured to mechanically force air from the air pouch 1064 into a nozzle 1066.

EXAMPLES

Table 1 below shows example carrier layer compositions. Table 2 below shows example compositions used to form the carrier layer and the nanomaterial layer or a pre-layered film or liquid mixture including the carrier and nanomaterial layers.

TABLE 1

| Ex. | Biopolymer | Solvent |
| --- | --- | --- |
| 1 | PHA | DCM |
| 2 | PBS | DCM |

TABLE 1-continued

| Ex. | Biopolymer | Solvent |
| --- | --- | --- |
| 3 | lignin | DCM |
| 4 | PHA and PBS | DCM |
| 5 | PHA and lignin | DCM |
| 6 | PBS and lignin | DCM |
| 7 | PHA, PBS, and lignin | DCM |
| 8 | PHA | DCMS |
| 9 | PBS | DCMS |
| 10 | lignin | DCMS |
| 11 | PHA and PBS | DCMS |
| 12 | PHA and lignin | DCMS |
| 13 | PBS and lignin | DCMS |
| 14 | PHA, PBS, and lignin | DCMS |
| 15 | PHA | hydrofluoroether |
| 16 | PBS | hydrofluoroether |
| 17 | lignin | hydrofluoroether |
| 18 | PHA and PBS | hydrofluoroether |
| 19 | PHA and lignin | hydrofluoroether |
| 20 | PBS and lignin | hydrofluoroether |
| 21 | PHA, PBS, and lignin | hydrofluoroether |
| 22 | PHA | DCM and DCMS |
| 23 | PBS | DCM and DCMS |
| 24 | lignin | DCM and DCMS |
| 25 | PHA and PBS | DCM and DCMS |
| 26 | PHA and lignin | DCM and DCMS |
| 27 | PBS and lignin | DCM and DCMS |
| 28 | PHA, PBS, and lignin | DCM and DCMS |
| 29 | PHA | DCM and hydrofluoroether |
| 30 | PBS | DCM and hydrofluoroether |
| 31 | lignin | DCM and hydrofluoroether |
| 32 | PHA and PBS | DCM and hydrofluoroether |
| 33 | PHA and lignin | DCM and hydrofluoroether |
| 34 | PBS and lignin | DCM and hydrofluoroether |
| 35 | PHA, PBS, and lignin | DCM and hydrofluoroether |
| 36 | PHA | DCMS and hydrofluoroether |
| 37 | PBS | DCMS and hydrofluoroether |
| 38 | lignin | DCMS and hydrofluoroether |
| 39 | PHA and PBS | DCMS and hydrofluoroether |
| 40 | PHA and lignin | DCMS and hydrofluoroether |
| 41 | PBS and lignin | DCMS and hydrofluoroether |
| 42 | PHA, PBS, and lignin | DCMS and hydrofluoroether |
| 43 | PHA | DCM, DCMS, and hydrofluoroether |
| 44 | PBS | DCM, DCMS, and hydrofluoroether |
| 45 | lignin | DCM, DCMS, and hydrofluoroether |
| 46 | PHA and PBS | DCM, DCMS, and hydrofluoroether |
| 47 | PHA and lignin | DCM, DCMS, and hydrofluoroether |
| 48 | PBS and lignin | DCM, DCMS, and hydrofluoroether |
| 49 | PHA, PBS, and lignin | DCM, DCMS, and hydrofluoroether |

TABLE 2

| Ex. | Biopolymer | Solvent | Nanoparticles |
| --- | --- | --- | --- |
| 50 | PHA | DCMS | silicon dioxide |
| 51 | PHA | DCM and DCMS | silicon dioxide |
| 52 | PBS | DCMS | silicon dioxide |
| 53 | PBS | DCM and DCMS | silicon dioxide |
| 54 | lignin | DCMS | silicon dioxide |
| 55 | lignin | DCM and DCMS | silicon dioxide |
| 56 | PHA and PBS | DCMS | silicon dioxide |
| 57 | PHA and PBS | DCM and DCMS | silicon dioxide |
| 58 | PHA and lignin | DCMS | silicon dioxide |
| 59 | PHA and lignin | DCM and DCMS | silicon dioxide |
| 60 | PBS and lignin | DCMS | silicon dioxide |
| 61 | PBS and lignin | DCM and DCMS | silicon dioxide |
| 62 | PHA, PBS, and lignin | DCMS | silicon dioxide |
| 63 | PHA, PBS, and lignin | DCM and DCMS | silicon dioxide |
| 64 | PHA | DCMS | zinc oxide |
| 65 | PHA | DCM and DCMS | zinc oxide |
| 66 | PBS | DCMS | zinc oxide |
| 67 | PBS | DCM and DCMS | zinc oxide |
| 68 | lignin | DCMS | zinc oxide |
| 69 | lignin | DCM and DCMS | zinc oxide |
| 70 | PHA and PBS | DCMS | zinc oxide |

TABLE 2-continued

TABLE 2-continued

| Ex. | Biopolymer | Solvent | Nanoparticles |
| --- | --- | --- | --- |
| 71 | PHA and PBS | DCM and DCMS | zinc oxide |
| 72 | PHA and lignin | DCMS | zinc oxide |
| 73 | PHA and lignin | DCM and DCMS | zinc oxide |
| 74 | PBS and lignin | DCMS | zinc oxide |
| 75 | PBS and lignin | DCM and DCMS | zinc oxide |
| 76 | PHA, PBS, and lignin | DCMS | zinc oxide |
| 77 | PHA, PBS, and lignin | DCM and DCMS | zinc oxide |
| 78 | PHA | DCMS | silicon dioxide and zinc oxide |
| 79 | PHA | DCM and DCMS | silicon dioxide and zinc oxide |
| 80 | PBS | DCMS | silicon dioxide and zinc oxide |
| 81 | PBS | DCM and DCMS | silicon dioxide and zinc oxide |
| 82 | lignin | DCMS | silicon dioxide and zinc oxide |
| 83 | lignin | DCM and DCMS | silicon dioxide and zinc oxide |
| 84 | PHA and PBS | DCMS | silicon dioxide and zinc oxide |
| 85 | PHA and PBS | DCM and DCMS | silicon dioxide and zinc oxide |
| 86 | PHA and lignin | DCMS | silicon dioxide and zinc oxide |
| 87 | PHA and lignin | DCM and DCMS | silicon dioxide and zinc oxide |
| 88 | PBS and lignin | DCMS | silicon dioxide and zinc oxide |
| 89 | PBS and lignin | DCM and DCMS | silicon dioxide and zinc oxide |
| 90 | PHA, PBS, and lignin | DCMS | silicon dioxide and zinc oxide |
| 91 | PHA, PBS, and lignin | DCM and DCMS | silicon dioxide and zinc oxide |
| 92 | PHA | hydrofluoroether | silicon dioxide |
| 93 | PBS | hydrofluoroether | silicon dioxide |
| 94 | lignin | hydrofluoroether | silicon dioxide |
| 95 | PHA and PBS | hydrofluoroether | silicon dioxide |
| 96 | PHA and lignin | hydrofluoroether | silicon dioxide |
| 97 | PBS and lignin | hydrofluoroether | silicon dioxide |
| 98 | PHA, PBS, and lignin | hydrofluoroether | silicon dioxide |
| 99 | PHA | hydrofluoroether | zinc oxide |
| 100 | PBS | hydrofluoroether | zinc oxide |
| 101 | lignin | hydrofluoroether | zinc oxide |
| 102 | PHA and PBS | hydrofluoroether | zinc oxide |
| 103 | PHA and lignin | hydrofluoroether | zinc oxide |
| 104 | PBS and lignin | hydrofluoroether | zinc oxide |
| 105 | PHA, PBS, and lignin | hydrofluoroether | zinc oxide |
| 106 | PHA | hydrofluoroether | silicon dioxide and zinc oxide |
| 107 | PBS | hydrofluoroether | silicon dioxide and zinc oxide |
| 108 | lignin | hydrofluoroether | silicon dioxide and zinc oxide |
| 109 | PHA and PBS | hydrofluoroether | silicon dioxide and zinc oxide |
| 110 | PHA and lignin | hydrofluoroether | silicon dioxide and zinc oxide |
| 111 | PBS and lignin | hydrofluoroether | silicon dioxide and zinc oxide |
| 112 | PHA, PBS, and lignin | hydrofluoroether | silicon dioxide and zinc oxide |
| 113 | PHA | DCM and hydrofluoroether | silicon dioxide |
| 114 | PBS | DCM and hydrofluoroether | silicon dioxide |
| 115 | lignin | DCM and hydrofluoroether | silicon dioxide |
| 116 | PHA and PBS | DCM and hydrofluoroether | silicon dioxide |
| 117 | PHA and lignin | DCM and hydrofluoroether | silicon dioxide |
| 118 | PBS and lignin | DCM and hydrofluoroether | silicon dioxide |
| 119 | PHA, PBS, and lignin | DCM and hydrofluoroether | silicon dioxide |
| 120 | PHA | DCM and hydrofluoroether | zinc oxide |
| 121 | PBS | DCM and hydrofluoroether | zinc oxide |
| 122 | lignin | DCM and hydrofluoroether | zinc oxide |
| 123 | PHA and PBS | DCM and hydrofluoroether | zinc oxide |
| 124 | PHA and lignin | DCM and hydrofluoroether | zinc oxide |
| 125 | PBS and lignin | DCM and hydrofluoroether | zinc oxide |
| 126 | PHA, PBS, and lignin | DCM and hydrofluoroether | zinc oxide |
| 127 | PHA | DCM and hydrofluoroether | silicon dioxide and zinc oxide |
| 128 | PBS | DCM and hydrofluoroether | silicon dioxide and zinc oxide |
| 129 | lignin | DCM and hydrofluoroether | silicon dioxide and zinc oxide |
| 130 | PHA and PBS | DCM and hydrofluoroether | silicon dioxide and zinc oxide |
| 131 | PHA and lignin | DCM and hydrofluoroether | silicon dioxide and zinc oxide |
| 132 | PBS and lignin | DCM and hydrofluoroether | silicon dioxide and zinc oxide |
| 133 | PHA, PBS, and lignin | DCMS and hydrofluoroether | silicon dioxide and zinc oxide |
| 134 | PHA | DCMS and hydrofluoroether | silicon dioxide and zinc oxide |
| 135 | PBS | DCMS and hydrofluoroether | silicon dioxide |
| 136 | lignin | DCMS and hydrofluoroether | silicon dioxide |
| 137 | PHA and PBS | DCMS and hydrofluoroether | silicon dioxide |
| 138 | PHA and lignin | DCMS and hydrofluoroether | silicon dioxide |
| 139 | PBS and lignin | DCMS and hydrofluoroether | silicon dioxide |
| 140 | PHA, PBS, and lignin | DCMS and hydrofluoroether | silicon dioxide |
| 141 | PHA | DCMS and hydrofluoroether | zinc oxide |
| 142 | PBS | DCMS and hydrofluoroether | zinc oxide |
| 143 | lignin | DCMS and hydrofluoroether | zinc oxide |
| 144 | PHA and PBS | DCMS and hydrofluoroether | zinc oxide |
| 145 | PHA and lignin | DCMS and hydrofluoroether | zinc oxide |
| 146 | PBS and lignin | DCMS and hydrofluoroether | zinc oxide |
| 147 | PHA, PBS, and lignin | DCMS and hydrofluoroether | zinc oxide |
| 148 | PHA | DCMS and hydrofluoroether | silicon dioxide and zinc oxide |
| 149 | PBS | DCMS and hydrofluoroether | silicon dioxide and zinc oxide |
| 150 | lignin | DCMS and hydrofluoroether | silicon dioxide and zinc oxide |
| 151 | PHA and PBS | DCMS and hydrofluoroether | silicon dioxide and zinc oxide |
| 152 | PHA and lignin | DCMS and hydrofluoroether | silicon dioxide and zinc oxide |
| 153 | PBS and lignin | DCMS and hydrofluoroether | silicon dioxide and zinc oxide |
| 154 | PHA, PBS, and lignin | DCMS and hydrofluoroether | silicon dioxide and zinc oxide |
| 155 | PHA | DCM, DCMS, and hydrofluoroether | silicon dioxide |
| 156 | PBS | DCM, DCMS, and hydrofluoroether | silicon dioxide |
| 157 | lignin | DCM, DCMS, and hydrofluoroether | silicon dioxide |
| 158 | PHA and PBS | DCM, DCMS, and hydrofluoroether | silicon dioxide |
| 159 | PHA and lignin | DCM, DCMS, and hydrofluoroether | silicon dioxide |
| 170 | PBS and lignin | DCM, DCMS, and hydrofluoroether | silicon dioxide |
| 171 | PHA, PBS, and lignin | DCM, DCMS, and hydrofluoroether | silicon dioxide |
| 172 | PHA | DCM, DCMS, and hydrofluoroether | zinc oxide |
| 173 | PBS | DCM, DCMS, and hydrofluoroether | zinc oxide |
| 174 | lignin | DCM, DCMS, and hydrofluoroether | zinc oxide |
| 175 | PHA and PBS | DCM, DCMS, and hydrofluoroether | zinc oxide |

TABLE 2-continued

| Ex. | Biopolymer | Solvent | Nanoparticles |
|---|---|---|---|
| 176 | PHA and lignin | DCM, DCMS, and hydrofluoroether | zinc oxide |
| 177 | PBS and lignin | DCM, DCMS, and hydrofluoroether | zinc oxide |
| 178 | PHA, PBS, and lignin | DCM, DCMS, and hydrofluoroether | zinc oxide |
| 179 | PHA | DCM, DCMS, and hydrofluoroether | silicon dioxide and zinc oxide |
| 180 | PBS | DCM, DCMS, and hydrofluoroether | silicon dioxide and zinc oxide |
| 181 | lignin | DCM, DCMS, and hydrofluoroether | silicon dioxide and zinc oxide |
| 182 | PHA and PBS | DCM, DCMS, and hydrofluoroether | silicon dioxide and zinc oxide |
| 183 | PHA and lignin | DCM, DCMS, and hydrofluoroether | silicon dioxide and zinc oxide |
| 184 | PBS and lignin | DCM, DCMS, and hydrofluoroether | silicon dioxide and zinc oxide |
| 185 | PHA, PBS, and lignin | DCM, DCMS, and hydrofluoroether | silicon dioxide and zinc oxide |

As illustrated above, various embodiments of features for a degradable containment are disclosed. While particular embodiments and aspects of the present disclosure have been illustrated and described herein, various other changes and modifications can be made without departing from the spirit and scope of the disclosure. Moreover, although various aspects have been described herein, such aspects need not be utilized in combination. Accordingly, it is therefore intended that the appended claims cover all such changes and modifications that are within the scope of the embodiments shown and described herein.

It should now be understood that embodiments disclosed herein include systems, methods, and non-transitory computer-readable mediums for providing degradable containment features. It should also be understood that these embodiments are merely exemplary and are not intended to limit the scope of this disclosure.

What is claimed is:

1. A degradable containment comprising:
a shaped and cured outer structural layer constructed of a plurality of assembled parts of a pulp material, wherein the shape defines an interior space of the containment and wherein the shaped and cured outer structural layer comprises a thickness to achieve the structural integrity of the containment;
a combined layer of a biopolymer and a nanomaterial, said combined layer being directly layered onto an interior surface of the shaped and cured outer structural layer, wherein the combined layer is applied as
a liquid mixture including the nanomaterial mixed in liquid form with the biopolymer and applied to the shaped and cured outer structural layer;
wherein the combined layer is layered to the interior of the shaped and cured outer structural layer; and
wherein the combined layer acts as an adhesive to adhere the plurality of assembled parts together and seal the shaped and cured outer structural layer.

2. The degradable containment of claim 1, wherein the biopolymer includes polyhydroxyalkanoate, polybutylene succinate, lignin, or a mixture of two or more thereof.

3. The degradable containment of claim 1, wherein the pulp material is chosen from wood, paper, bamboo, hemp, minerals, agricultural products, agricultural waste, recycled materials, or a mixture of two or more thereof.

4. The degradable containment of claim 1, wherein the nanomaterial includes at least one of the following: a silicon dioxide nanomaterial and a zinc oxide nanomaterial.

5. The degradable containment of claim 1, wherein
the biopolymer includes polyhydroxyalkanoate, polybutylene succinate, lignin, or a mixture of two or more thereof;
the biopolymer is dispersed in dichloromethane, dichlorodimethylsilane, hydrofluoroether, or a mixture of two or more thereof; and
the nanomaterial includes at least one of a silicon dioxide nanomaterial and a zinc oxide nanomaterial.

6. A degradable containment comprising:
a shaped and cured outer structural layer constructed of a plurality of parts of a pulp material including at least one of the following: an organic product or an organic-based product, wherein the shape defines an interior space of the containment and wherein the shaped and cured outer structural layer comprises a thickness to achieve the structural integrity of the containment;
a combined layer of a biopolymer and a nanomaterial, said combined layer being directly layered onto an interior surface of the shaped and cured outer structural layer, wherein the combined layer is applied as:
a liquid mixture including the nanomaterial mixed in liquid form with the biopolymer and applied to the shaped and cured outer structural layer; and
wherein
the biopolymer including polyhydroxyalkanoate, polybutylene succinate, lignin, or a mixture of two or more thereof; and
the nanomaterial including at least one of a silicon dioxide nanomaterial and a zinc oxide nanomaterial,
wherein the combined layer is layered to the interior of the shaped and cured outer structural layer; and
wherein the combined layer acts as an adhesive to adhere the plurality of assembled parts together and seal the shaped and cured outer structural layer.

7. The degradable containment of claim 6, wherein the organic product or the organic-based product is chosen from wood, paper, bamboo, hemp, minerals, agricultural products, agricultural waste, recycled materials, or a mixture of two or more thereof.

8. The degradable containment of claim 6, wherein the outer structural layer includes two mirror halves that are pieced together during production.

9. The degradable containment of claim 6, wherein the outer structural layer includes two mirror halves, each mirror half having at least one flange, the at least one flange from one of the two mirror halves aligning with the at least one flange from the other of the two mirror halves to form the outer structural layer together.

10. The degradable containment of claim 9, wherein at least one of the biopolymer and/or the nanomaterial extends onto the at least one flange of each of the two mirror halves and acts as an adhesive to piece together the two mirror halves together.

11. The degradable containment of claim 6, wherein the biopolymer and/or the nanomaterial extend from a cavity of the degradable containment, wrap around the outer structural layer at a lid receiving portion of the degradable containment, and continue on to cover at least a portion of an exterior surface of the outer structural layer.

12. A degradable containment comprising:
a shaped and cured outer structural layer constructed of a plurality of parts of a pulp material including at least one of the following: an organic product or an organic-based product, wherein the shape defines an interior space of the containment and wherein the shaped and cured outer structural layer comprises a thickness to achieve the structural integrity of the containment;

a combined layer of a biopolymer and a nanomaterial, said combined layer being directly layered onto an interior surface of the shaped and cured outer structural layer, wherein the combined layer is applied as a liquid mixture including the nanomaterial mixed in liquid form with the biopolymer and applied to the shaped and cured outer structural layer;

wherein the biopolymer including polyhydroxyalkanoate, polybutylene succinate, lignin, or a mixture of two or more thereof;

the nanomaterial including at least one of a silicon dioxide nanomaterial and a zinc oxide nanomaterial and wherein the combine layer is layered to the interior of the shaped and cured outer structural layer and adhere the plurality of assembled parts;

the combined layer acts as an adhesive to adhere the plurality of assembled parts together and seal the shaped and cured outer structural layer; and a modular containment neck secured in a top portion of the degradable containment.

13. The degradable containment of claim 12, wherein the modular containment neck includes polypropylene, high density polyethylene, a biodegradable polymer, a biodegradable non-polymer, a biopolymer or a mixture thereof.

14. The degradable containment of claim 12, wherein the modular containment neck includes at least one tab configured to secure the modular containment neck in the top portion of the degradable containment.

15. The degradable containment of claim 12, wherein the modular containment neck includes a screw-top configured to form a seal between the degradable containment and the modular containment neck.

16. The degradable containment of claim 12, wherein the modular containment neck includes a securing flange configured to secure the modular containment neck in the top portion of the degradable containment.

17. The degradable containment of claim 12, wherein the degradable containment further includes a lid securable to the modular containment neck.

* * * * *